(12) United States Patent
Mohamed et al.

(10) Patent No.: US 7,233,984 B2
(45) Date of Patent: Jun. 19, 2007

(54) LIGHT WEIGHT FILE I/O OVER SYSTEM AREA NETWORKS

(75) Inventors: Ahmed H. Mohamed, Sammamish, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/292,678

(22) Filed: Nov. 12, 2002

(65) Prior Publication Data

US 2004/0093389 A1 May 13, 2004

(51) Int. Cl.
*G06F 15/13* (2006.01)
(52) U.S. Cl. .................. 709/220; 709/203; 709/223; 370/217
(58) Field of Classification Search ............... 709/203, 709/220, 223; 370/217
See application file for complete search history.

(56) References Cited

U.S. PATENT DOCUMENTS

| | | | |
|---|---|---|---|
| 6,212,160 B1 * | 4/2001 | Barbieri et al. ............. | 370/217 |
| 6,601,094 B1 * | 7/2003 | Mentze et al. ............... | 709/220 |
| 6,839,750 B1 * | 1/2005 | Bauer et al. ................. | 709/223 |
| 2002/0069238 A1 * | 6/2002 | Eard et al. ................... | 709/202 |
| 2002/0073257 A1 * | 6/2002 | Beukema et al. ........... | 710/105 |
| 2003/0208531 A1 * | 11/2003 | Matters et al. .............. | 709/203 |

OTHER PUBLICATIONS

Fetters, Dave, "Building a Storage Area Network", Servers & Peripherals Workshop, Network Computing, May 15, 2000, retrieved from www.networkcomputing.com/1109/1109ws1.html, Jul. 8, 2004 (4ps\ages).

* cited by examiner

*Primary Examiner*—Jinsong Hu
(74) *Attorney, Agent, or Firm*—Merchant & Gould

(57) ABSTRACT

An effective I/O protocol for taking advantage of system area network functionality, whether or not a particular application is written to do so, is provided. Transparently to the application, the I/O protocol routes application I/O commands via legacy transmission protocols or via remote direct memory access protocols as appropriate. When communicating via remote direct memory access protocols, the I/O protocol can take advantage of multiple data exchange commands implemented by these protocols to perform the required data exchange. Once an I/O operation has completed, the I/O protocol passes a completion notification to the application using a polling or interrupt construct.

26 Claims, 9 Drawing Sheets

LIGHT WEIGHT FILE I/O OVER SYSTEM AREA NETWORKS

TECHNICAL FIELD

This invention relates generally to protocols for taking advantage of system area network technology and, more particularly, relates to the routing of network transmissions via legacy protocols or remote direct memory access protocols.

BACKGROUND

As the Internet has grown from a few servers controlled by the government and a few educational institutions into a vast, heterogeneous network of servers and clients, the demands on servers have grown as well. Servers connected to the Internet must often deal with thousands of requests every second, as users from around the world seek to access data. In a typical server topology, web servers respond to basic user inquiries and forward particular requests to application servers; these servers host applications with which the users interact, and have access to database servers in which application data is stored. Web servers, application servers and database servers are often not running on the same physical computers. Consequently, application servers, which respond to forwarded users' inquiries, execute application code and exchange data with database servers, must implement increasingly powerful hardware to keep pace with the demands placed on them. Although rapid gains have been made in both networking technology and processor speed, recent networking improvements have vastly outstripped the computer system improvements necessary to take advantage of them.

Traditionally, in order to send information across a backend network, application servers exchange data packaged according to various network transport protocols with the database servers, encoding and decoding them as necessary to extract the relevant information. According to the standard networking, Open System Interconnect (OSI) model, there are seven layers through which a transmission travels: application layer, presentation layer, session layer, transport layer, network layer, data link layer and physical layer. Using legacy network devices and drivers, software processes performed by the CPU implement all but the final two network layers (data link and physical), which are implemented on the networking hardware itself. As a result, in addition to managing applications and application requests, an application server must dedicate processing time to the relatively simple but time-consuming network functionality. Moreover, these OSI processes also waste the valuable system resources necessary to copy information between memory buffers. In these legacy systems, servers are not limited by the bandwidth of the underlying network connecting them, but rather are limited by their processors' ability to balance application usage with networking functions.

One solution to this problem is presented by system area network technology. A system area network (SAN) is defined as a high-performance, connection-oriented network that provides high-bandwidth and low-latency characteristics to its nodes, often servers. Importantly, in addition to the high-speed connections and the high-speed routing technology, SANs employ specially designed network hardware, or network interface cards (NICs) to take advantage of new transfer protocols. Most important among these protocols is remote direct memory access (RDMA), a protocol defining a method by which a compatible NIC can directly send data to and receive data from remote memory connected to the SAN through another compatible NIC. Thus, the RDMA protocol avoids wasting the processor cycles required to encode and decode transferred data by offloading these processes to the RDMA-compatible NIC. Since the NIC becomes responsible for the packaging, flow, error checking of the data and even the transfer of the data to an appropriate memory buffer, the server's CPU cycles are freed from these tasks to provide more application resources. In this way, network performance (measured by how many requests can be handled in a given period of time) can be markedly improved without requiring a corresponding improvement in CPU speed.

RDMA itself defines a complex set of protocols that a compatible NIC and computer system must adhere to. Prior to sending or receiving data, a server using an RDMA-compatible NIC must register memory buffers with the NIC. These registered buffers then become the memory locations that can be directly accessed from any RDMA-compatible NIC communicating with the local memory controller. This initial registration is relatively resource-intensive but prevents the overwriting of sensitive information. As the NIC continues to communicate using RDMA commands, the initially registered memory buffers may be de-registered and new buffers registered to send and receive data.

Exploiting RDMA functionality, a compatible NIC can send and receive data using three sets of commands: Read operations, Write operations, and Post Send/Post Receive operations. A computer hosting long-term information can generically be referred to as a server, while the computer accessing that information (writing or reading it) can be referred to as a client. When a client wishes to read information stored on a server, the respective RDMA-compatible NICs first communicate regarding what information should be read, and the server sends an identifier for the registered memory location containing that information to the client's NIC. The client's NIC then sends an RDMA Read request to the server's NIC identifying the location of the stored information. The server's NIC receives the request, processes it, directly accesses the stored information at the memory location using the memory controller and forwards the information to the client's NIC, which processes the information and stores the information in its own registered memory buffer. Upon completion, the server's NIC sends a message to the client's NIC that the Read operation was completed successfully. The Write operation is similar in operation. In order to write information onto a server, a client's NIC first requests information from the server's NIC regarding where information should be written. Upon receiving virtual address information, the client's NIC sends a Write RDMA command along with the data to the server's NIC, which directly writes the data to the address indicated by the transmission. Upon completion, the server's NIC sends a message to the client's NIC indicating that the Write operation was completed successfully.

Although these commands are exceptionally quick and avoid many of the drawbacks of legacy networks, there are security issues raised by disclosing the memory locations to which other computers can write directly. As a result, two related commands are defined, Post Send and Post Receive. Whereas in normal RDMA Read and Write operations, the NIC sending the command specifies both the originating and destination addresses, in Post Send and Post Receive mode, the sending computer's NIC (whether client or server) specifies the address from which the information will be sent, while the receiving computer's NIC (whether client or server) specifies the address at which the information will be received. In this more secure implementation, the machines originally communicate concerning the size and content of the message, but neither machine knows the details of the other's internal memory buffers.

The benefits of SANs, and associated RDMA protocols are clear. Using this technology, an application server with less computing power can provide information access to a greater number of users by offloading network protocol tasks to RDMA-compatible NIC hardware, thus freeing CPU cycles and obviating unnecessary data duplication. However, having developed this new networking technology, a difficulty remains in coordinating it with existing applications and protocols. If every application were rewritten to comply with SAN technology, this would not only represent a huge undertaking, but in addition, two sets of application would have to be employed, one ported for legacy hardware and one for SAN hardware. Moreover, if the SAN hardware ever failed, the newly written applications would be useless. On the other hand, if operating system-level protocols were simply redesigned to take advantage of this new SAN technology, the task of rewriting every application may be avoided, but, if the SAN hardware failed, the network communications would still fail if support for legacy protocols were removed. As used in this specification, legacy protocols refer to those networking protocols used with network interfaces before system area networks were implemented. Typically, these protocols, as described above, require a great deal of software processing before the network hardware implements the most basic data link and physical layer functionality.

Therefore, there is a need for an I/O protocol that can take advantage of the new SAN technology while retaining compatibility with older programs and older legacy network technology. Such a system would enable older programs to take advantage of the speed improvements inherent in RDMA, while retaining compatibility with older network interfaces, to protect against SAN failure and to provide access to older network devices.

SUMMARY

The present invention is directed to an I/O protocol for allowing applications to take advantage of system area network functionality, whether or not they were specifically designed to do so. The present invention is further directed to transparently routing network transmissions through legacy protocols or Remote Direct Memory Access (RDMA) protocols as appropriate for the environment.

In an embodiment, clients and servers communicate to discover whether or not they can use RDMA with respect to a particular file. If they can use RDMA, then an I/O protocol called Light Weight I/O Protocol (LWIO) intercepts read and write requests to the file initiated at the client, and translates them into the appropriate RDMA-compatible commands.

In one embodiment, a number of clients and servers are connected by RDMA-compatible network-interface cards (NICs) to a high-speed System Area Network (SAN), and the clients and servers have access to LWIO implementations. A client is defined as any computer that reads to and/or writes from data stored on a server. When a client wishes to access some piece of data, such as a file, stored on a server, it communicates with the server, and a means to manipulate the remote file, often called a handle, is returned to the client. The client and server then discover whether or not they can communicate using RDMA protocols. If they can, the client informs the LWIO implementation that this file is RDMA-compatible, so that subsequent read and write commands might utilize the advantageous RDMA functionality.

When a program on the client attempts to read and/or write data through the handle to and from the remote file, LWIO intercepts these commands transparently to the program and sends them through the normal network transmission layer or through the RDMA layer as appropriate. When the RDMA layer is used, the LWIO protocol defines the particular mode of RDMA transfer. A number of methods can be used, including combinations of RDMA Reads, Writes, Post Sends and Post Receives. For security and implementation reasons, some RDMA commands are preferable in certain environments.

Once the client and server have completed their RDMA communications, a completion notification is forwarded to the client application that initiated the transfer. In traditional I/O implementations, such completion notifications use interrupts. These appropriately named events interrupt CPU processes through an interrupt queue and waste valuable system resources sending the information to the correct application. In one embodiment of the present invention, the LWIO protocol allows completion notifications to be received by polling. In this LWIO polling, the application periodically checks some region of the application's memory for a completion notification sent by LWIO without interrupting the processor. Both polling and interrupts can be used by the LWIO protocol to maximize their respective advantages.

In order to facilitate LWIO's organization and coordination of LWIO-compatible handles on the client, an abstraction called an LWIO port can be used. An LWIO port is a data construct that associates a number of handles according to their affinities, or shared characteristics, such that actions can be performed on these handles concurrently. The use of this construct has several advantages, including: the ability to modify the attributes of many different handles at once, the ease with which an I/O completion notification can be registered and the ability to share system resources across many file handles.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
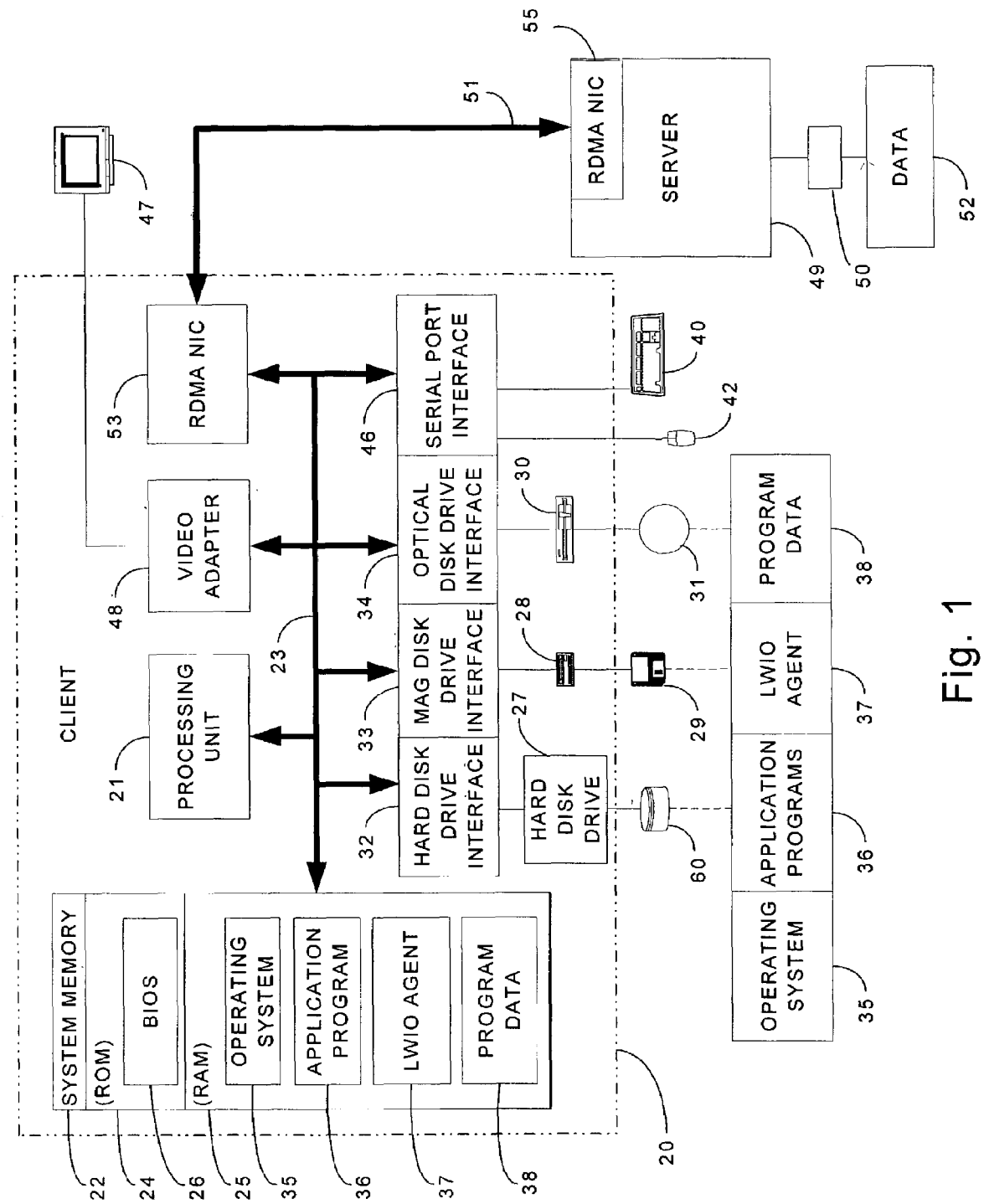
FIG. 1 is a schematic diagram generally illustrating an exemplary computer system usable in an embodiment of the invention.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computer. Generally, program modules include routines, programs, agents, scripts, objects, components, data structures and the like that perform particular tasks or implement particular abstract data types.

The invention may be implemented in computer system configurations other than a traditional client computer. For example, the invention may be realized in servers, personal computers, hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose computing device in the form of a conventional client 20.

Before describing the invention in detail, the computing environment in which the invention operates is described in connection with FIG. 1.

The client 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the client 20, such as during start-up, is stored in ROM 24. The client 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the client 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, an LWIO agent 37, and program data 38. A user may enter commands and information into the client 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device can also be connected to the system bus 23 via an interface, such as a video adapter 48.

The client 20 operates in a networked environment using logical connections to one or more remote computers, such as a server 49. The server 49 may be another client, a personal computer, a router, a network PC, a peer device or other common network node, and typically includes many or all of the elements described above relative to the client 20, although only a memory storage device 50 has been illustrated in FIG. 1, upon which data 52 is stored that is used by the client's 20 application programs 36. The logical connection depicted in FIG. 1 is a system area network (SAN) 51. Such a networking environment is increasingly commonplace among clients and servers in high-load environments.

When used in a SAN networking environment, the client 20 is connected to the local network 51 through a remote direct memory access (RDMA)-compatible network interface card or adapter (NIC) 53. In order to take advantage of the RDMA protocols, the client 20 must be connected through this RDMA NIC 53 to at least one other RDMA NIC 55, as is shown connected to the server 49. In this networked environment, data 52 depicted relative to the client 20, or portions thereof, may be stored in the remote memory storage device 50.

In the following description, the invention is described with reference to acts and symbolic representations of operations performed by one or more computers, unless indicated otherwise. Such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art of computer science and computer engineering. The data structures for maintaining data are physical locations of the memory that have particular properties defined by the format of the data. Although the invention is described in the foregoing context, those of skill in the relevant art will appreciate that various of the acts and operations described hereinafter may also be implemented in hardware.

Figure 2:
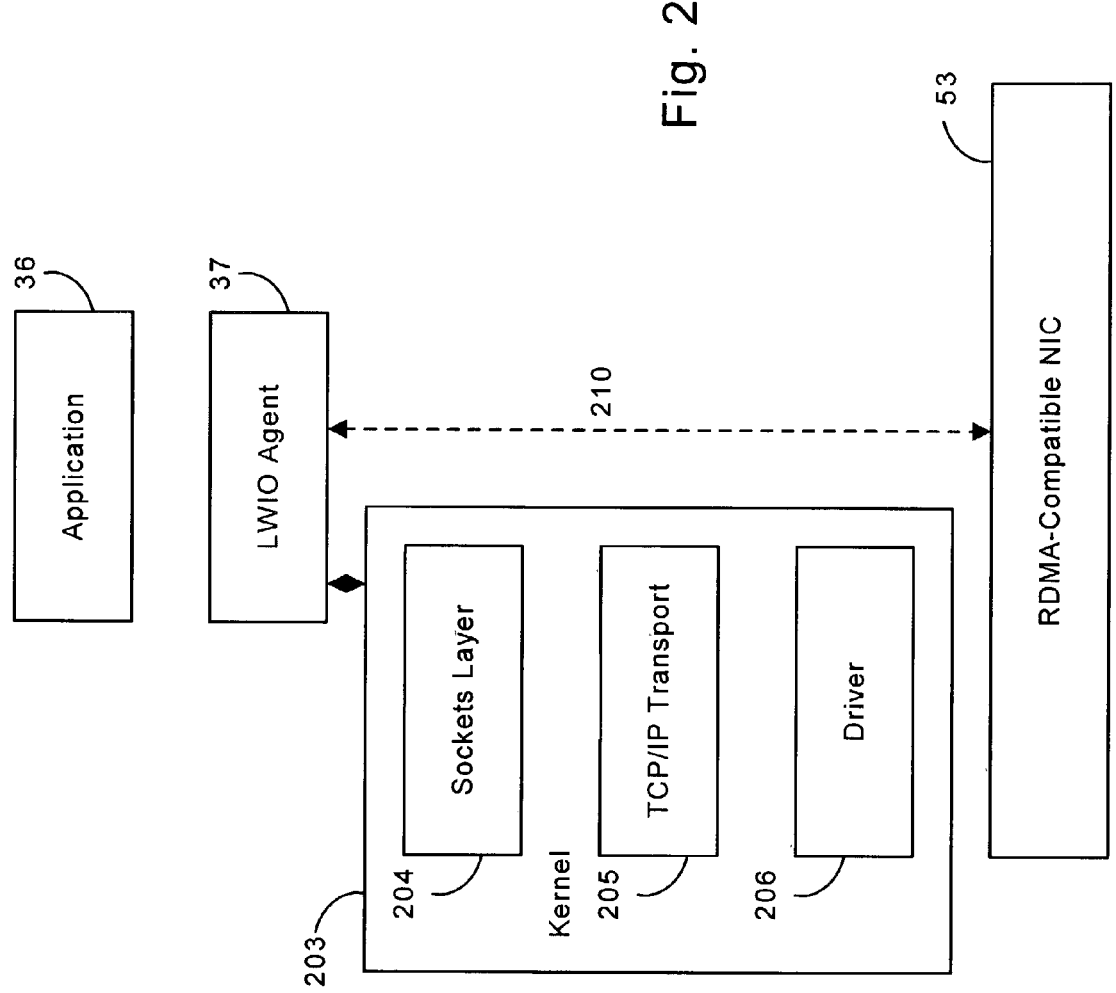
FIG. 2 is a schematic diagram illustrating an exemplary program structure for implementing an embodiment of the invention.

In accordance with an embodiment of the present invention, a Light Weight I/O (LWIO) agent 37, as illustrated in FIG. 2, is loaded onto a client 20 having a RDMA-compatible NIC 53. The agent 37 is a program for, among other purposes, intercepting I/O commands sent by the application 36 and the NIC 53. This agent 37 can be provided as part of the operating system 35, part of the application 36, a coded piece of hardware or as a separate program. In one embodiment, the agent 37 is a user-level separate program, thereby obviating the need to modify existing operating systems 35 and applications 36 to comply with RDMA protocols.

Upon receiving I/O commands sent by the application 36, the agent 37 makes a decision whether or not to route these commands directly to an RDMA-compatible NIC 53 (as indicated by path 210) or through the legacy network transmission layers 204–206 located in the kernel 203. By sending the commands directly to the RDMA NIC 53, the agent 37 can avoid unnecessary kernel-level, CPU-intensive processing. Therefore, the agent 37 preferably routes its commands directly by path 210. However, if the server 49 (to which these I/O transmissions will be sent) does not support the RDMA protocol, or if the impending data transfer will not support RDMA for some other reason, the agent 37 can route the commands to the normal kernel-level processes so that the data goes through the legacy network transmission steps 204–206, treating the RDMA-compatible NIC 53 essentially as a legacy NIC. Similarly, in the case of multiple NICs, some RDMA-compatible, and others legacy, the LWIO agent 37 could route the RDMA-compatible I/O commands directly (via path 210) to the RDMA-compatible NICs 53 and legacy I/O commands through the normal transmission steps 204–206 to the legacy NICs. The LWIO agent's principal role is to route commands either through the legacy framework, or through the newer system area network framework as appropriate.

Significantly, the agent's 37 routing is transparent to the application 36 sending the relevant I/O messages. In fact, in one embodiment, the application 36 sends legacy messages that would normally be routed directly to the kernel 203, but these messages are intercepted by the agent 37 and translated into RDMA commands if appropriate. As the agent 37 receives responses from the NIC 53, they are also interpreted to resemble those responses normally received by the application 36 from the kernel systems 203. By making the particular network mechanisms transparent to the application 36, existing applications 36 do not need to be modified to function correctly in system area networks 51, and their operation remains unchanged even as the agent 37 switches network mechanisms part way through an I/O transfer.

Figure 3:
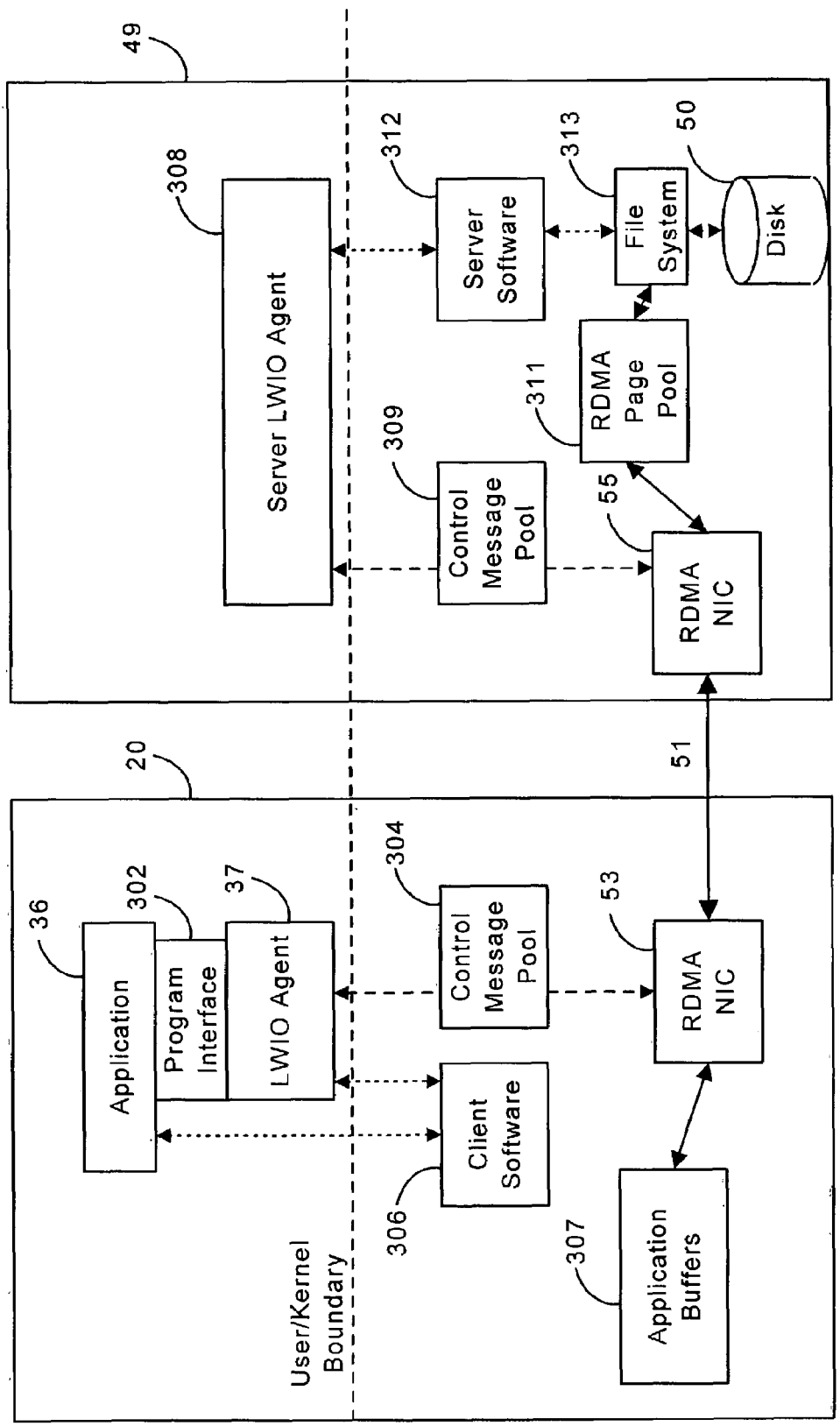
FIG. 3 is a flow diagram illustrating an LWIO legacy or RDMA decision according to an embodiment of the invention.

In order to better understand the environment in which the LWIO agent 37 acts, the exemplary network structure shown in FIG. 3 will be described in more detail. FIG. 3 illustrates two computers, one a server 49, the other a client 20 (although both may be servers for other clients), implementing the LWIO interfaces. As shown in the software architecture of FIG. 2, an application 36 residing on the client computer 20 sends messages, using a program interface 302, that are intercepted by an LWIO agent 37. As described above, the particular interface 302 used by the program may be a legacy program interface unmodified for newer networks. The LWIO agent 37 then routes these messages directly to the client's RDMA-compatible NIC 53 or through kernel-level network drivers to the client NIC 53. Assuming that the LWIO agent 37 is sending an I/O message directly to the client NIC 53, the LWIO agent 37 forwards the application's I/O message to a control message pool 304, which then forwards it on to the client's RDMA-compatible NIC 53. In alternative embodiments, the LWIO agent 37 may forward these messages directly to the client's RDMA-compatible NIC 53, implementing the message pool's buffering action in the program itself or in the NIC hardware. As the client NIC 53 is RDMA-compatible, it is shown as having direct read and write access to the application buffers 307. These buffers have been registered with the client's RDMA-compatible NIC 53, and, once registered, read and write access is available to external RDMA-compatible NICs that can correctly identify the memory locations. In order to make these RDMA communications more secure, a security key may also be passed between RDMA-compatible NICs, to prevent unauthorized access to exposed memory.

The client computer 20 communicates over a system area network 51 with a server computer 49. RDMA-compatible messages are exchanged across this network between the two RDMA-compatible NICs 53, 55. A server LWIO agent 308 resides on the server 49. In one embodiment, although there are similarities between the two LWIO agents 37, 308, there are a number of differences that relate to different security concerns. These security features dictate that the form of the data transfers between client and server are not transitive. In alternative embodiments, however, these two agents can be identically coded. The RDMA-compatible NIC 55 in the server 49 has access to an RDMA page pool 311. This pool 311 represents a number of changing memory buffers to which the server NIC 55 has access. In one embodiment, the server's LWIO agent 308 further has the ability to specify that only particular clients 20 can write to particular memory buffers 311, or limit the amount of data written by certain clients 20 to the memory buffers 311. By allowing client-specific limitations, the server's LWIO agent 308 can more efficiently manage the server's resources while providing a more secure environment. The RDMA page pool 311 is logically connected to the file system 313 that ultimately provides access to the data 52 stored on the disk 50.

Having described above in detail an environment in which the LWIO agent 37 acts, the following description is directed towards those functions performed by the LWIO agent 37 in such an environment. In an exemplary LWIO operation performed in the above-described environment, a client application 36 sends an I/O command to transfer data from a database record stored on the remote disk 50 to its application buffers 307. This interface 302 command is intercepted by the LWIO agent 37, which decides whether or not the data sought by the application 36 can be reached by RDMA protocols. If the transfer is RDMA-compatible, the agent 37 passes the command in RDMA form on to the client control message pool 304, until the client NIC 53 can accept another command. The NIC 53 checks that the buffers to which the data will be copied are registered among the other buffers 307. In an embodiment, if the buffers have not yet been registered, the NIC 53 coordinates with the LWIO agent 37 to register them. In alternative embodiments, the client NIC 53 can initially copy the received data to the application buffers 307 and subsequently inform the client LWIO agent 37 where the new data has been stored. The client NIC 53 then exchanges a series of RDMA messages with the server NIC 55. The server NIC 55 then sends a message through the control message pool 309 to the server's LWIO agent 308, indicating the information that the client 20 wishes to access. In one embodiment, the LWIO agent 308, or another server process 312, ensures that the client 20 has the requisite permissions to access and read this data. Assuming that the client 20 does have permission, a message is sent to the file system 313. The file system 313 then adds the record desired by the client 20 from the hardware storage medium 50 to the RDMA page pool 311 to which the server NIC 55 has access. The server's LWIO agent 308 informs the server RDMA NIC 55 that it has access to the record in question, and the data is sent directly to the application buffers 307. Significantly, while there are a number of steps involved in this communication, very few of them require CPU cycles or other system resources to complete.

While the description above provides a high-level overview of the LWIO protocol, the description below introduces some implementation details for the convenience of the reader. The first step when using the LWIO protocol is the creation of a handle used to access a remote file. In one embodiment, this handle is used by the LWIO agent 37 to distinguish between LWIO-compatible and non-LWIO-compatible file transfers. In alternative embodiments, all handles may be presumed suitable for RDMA protocols, and only upon RDMA failure does the LWIO agent 37 use legacy protocols.

Figure 4:
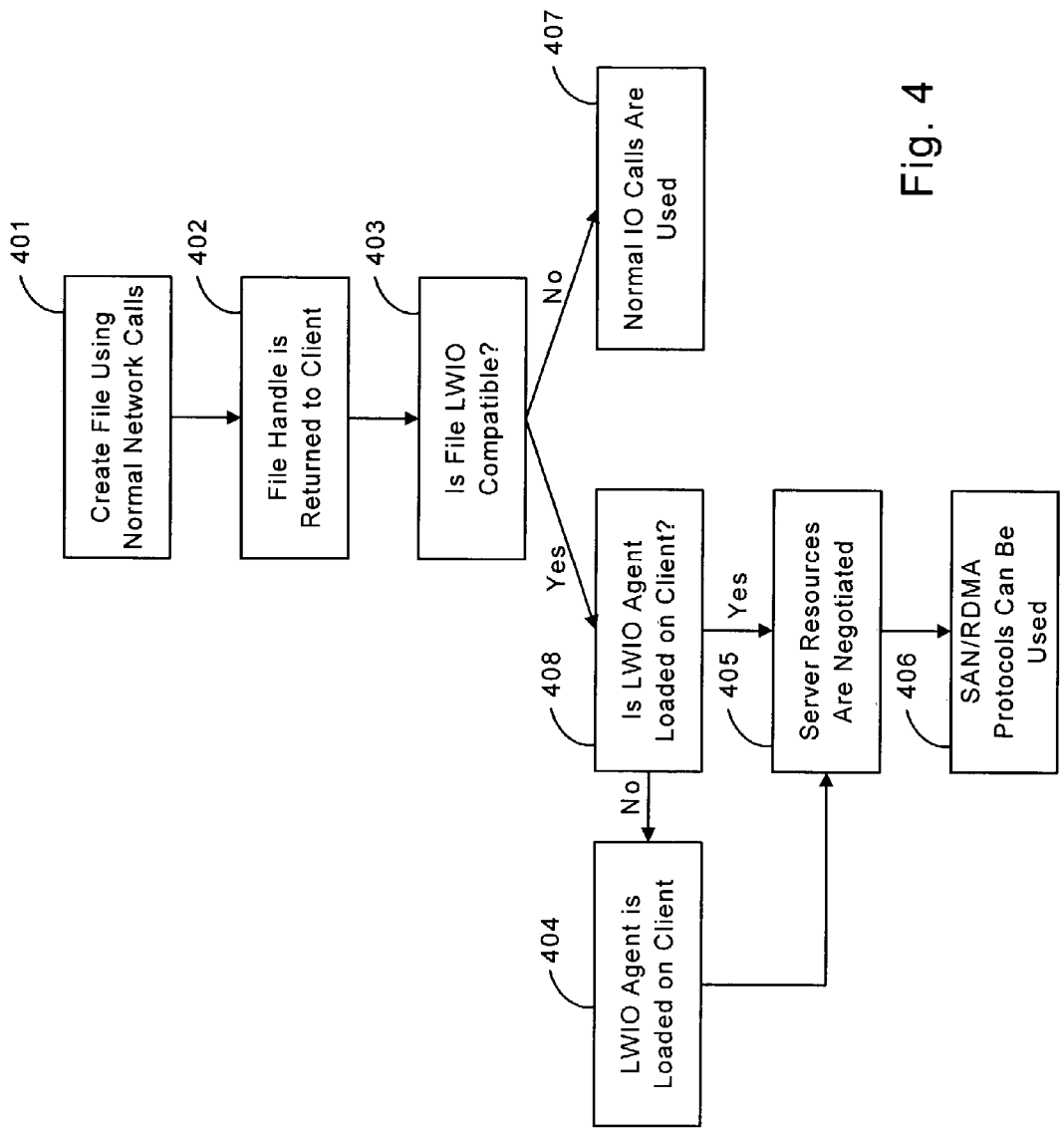
FIG. 4 is an architecture diagram illustrating an exemplary pair of computers on which an embodiment of the invention may be implemented.

In FIG. 4, a flow diagram is introduced to illustrate one method of creating and interpreting such a file handle. Before a handle can be created, the remote file itself is created, as in step 401. In an embodiment, existing client/server protocols perform these functions, although such is not required. For example, the Common Internet File System or CIFS can be used to open a file on a server 49. Of course, the file may also be created independently by the server 49 using legacy file systems 313, such as Microsoft Windows-brand NT File System (NTFS), in which case operation continues to step 402. When existing protocols are used to create this file remotely, the client 20 also indicates whether or not it has RDMA-compatible hardware. In alternative implementations, these messages may be sent earlier, or later, or may not be sent at all, if the devices in the network simply assume that the client RDMA NIC 53 is present and functional.

Once the file has been created, step 401, a handle to this remote file is returned to the client 20, as in step 402. In one embodiment, the client 20 receives along with this file handle a message indicating whether or not the LWIO protocol and associated RDMA protocols can be supported between the client 20 and the server 49. This message can be incorporated into the file handle itself as a number of bits attached to it, indicating that RDMA is acceptable or not. The message can alternatively be sent separately. In other embodiments, a message might not be received by the client 20 until an attempt to send I/O commands to the remote file using the handle is made.

Once the file handle has been returned to the client 20 along with the LWIO message, the client 20 records whether or not the remote file is RDMA-compatible. One means of recordation is to create a hash table, matching file handles with data indicating whether or not a particular handle is RDMA-compatible. The hash table implementation has the disadvantage of using excessive system resources. An alternative is to attach a series of bits to the end of the handle, which bits code whether or not the file is suitable for RDMA. Alternative methods for associating the file handle with information indicating that the file is or is not appropriate for RDMA may also be used.

This information is accessed by the client's LWIO agent 37 to determine whether or not a file and associated handle are RDMA-compatible, step 403. If the file is not RDMA-compatible, the I/O commands from an application are simply sent through the normal network transmission protocols located in the kernel 203, step 407. On the other hand, if the file is RDMA-compatible, and if this RDMA-compatible handle is the only RDMA-compatible handle active on the client 20, the LWIO agent 37 is loaded onto the client 20, step 404. In alternative embodiments, the LWIO agent 37 may always be running as a background process, or may begin running only when certain applications that tend to use RDMA-compatible file handles are run. Once the LWIO agent 37 has become operational, step 404, all I/O commands from the application are intercepted and parsed by the agent 37 as described above.

In one embodiment, the negotiations for server resources between the server 49 and client 20, step 405, comprise the client 20 first requesting a sufficient memory allocation on the server 49 to hold the anticipated amount of transferred data, with the server 49 then checking its present network load and amount of allocated memory 311 before granting permission. In alternative embodiments, other client-server negotiations may take place, or the client 20 or server 49 can dictate the amount of memory allocated on the other machine. After the completion of these negotiations, RDMA protocols are used by the LWIO interface 37 when the application issues I/O commands for the file handle, step 406.

Once the LWIO agent 37 is properly running on the client 20, and a file handle has been deemed RDMA-compatible, a portion of the client's memory is registered with the RDMA-compatible NIC 53 before the agent can successfully issue an RDMA command. In one embodiment, the LWIO agent 37 can pre-register portions of memory to be used by the file handle. To be even more efficient, these pre-registered portions of memory can be selected from memory recently registered for the use of other file handles. Since registration is such a resource-intensive process, it is often better to pre-register memory before a particular I/O command is called. However, the step of copying information to or from a memory buffer can also cost precious system resources, and the larger the memory transfer, the more costly. Thus, when a very large file transfer is going to be made using RDMA, using the pre-registered memory buffers may be an excessively resource-intensive operation.

Therefore, in a further embodiment, the LWIO agent 37 has the choice of copying the data to the pre-registered memory buffer, or registering the memory location where the data is stored, once an I/O command is received. When a large amount of data will be transferred, the registration process, however costly, can be a better alternative than the copying operation. The agent's 37 decision between these two processes can be made without knowing the details of the machine of the client 20. So, for example, in one embodiment, the LWIO agent 37 copies data to a pre-registered memory buffer for data less than or equal to 64 Kilobytes, and registers the memory location at command-time for data larger than 64 Kilobytes. Alternatively, the LWIO agent 37 can make this decision empirically, by comparing the time or system resources used when registering a memory location and copying a piece of memory. The amount of data at which copying uses as much resources as registration preferably becomes the switching point between copying and registration.

Having appropriately registered memory buffers, the LWIO agent 37 can, at this point, translate the application's I/O read and write commands into appropriate RDMA commands. The details of possible interpretations chosen by the LWIO agent 37 are shown in FIGS. 5–8. If a file handle on which a read or write command is performed is not RDMA-compatible, the LWIO agent 37 routes the command to the legacy network transmission layers 204–206, as described with respect to FIG. 2. However, if a file handle on which a read or write command is performed is RDMA-compatible, the LWIO agent 37 can use any of the RDMA protocols to accomplish the appropriate transfer.

Figure 5:
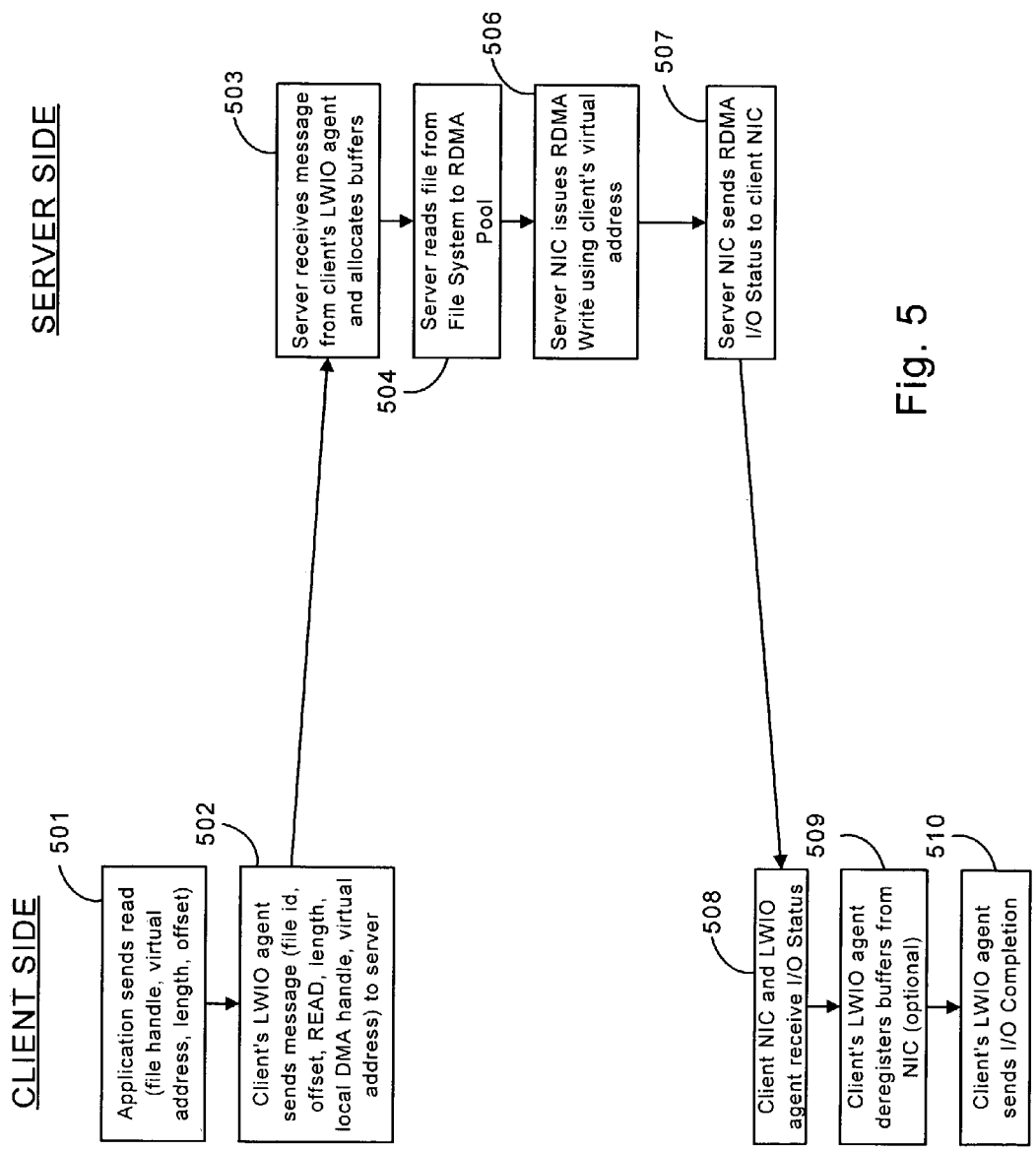
FIG. 5 is a flow diagram illustrating the steps taken in creating an LWIO-compatible file handle within an embodiment of the invention.

Referring to FIG. 5, a read command, issued by an application 38 in step 501, is executed by the LWIO agent 37 using RDMA protocols. In the embodiment shown, the LWIO agent 37 first sends a control message to the server 49 comprising among other information: the identification of the file to be read, the length of the file, the client's memory handle and the client's DMA virtual address, step 502. Once the server 49 receives this message, it allocates buffers in its RDMA Page Pool 311 (if they were not already allocated) to accept outgoing data, step 503. Having received the file identification and its offset, the server 49 uses native file system calls, step 504, to retrieve the data from the disk 50 to the RDMA Page Pool 311. Using the client's DMA virtual address, the server NIC 55 then issues a RDMA Write command, step 506, which copies the requested information in the RDMA Page Pool 311 directly to the application buffers 307 on the client 20. The server RDMA-compatible NIC 55 then sends its I/O completion status to the client NIC 53, step 507. If the application buffer at which the data was received was registered with the client NIC 53 specifically for this transfer, the buffer can be de-registered at this time to prevent unexpected and unauthorized access through the NIC 53, step 509. On the other hand, if this was a pre-registered buffer to which many writes will be performed, it will not be deregistered at this time, unless all LWIO processes are completed. To complete the communication sequence, the client LWIO agent 37 sends an I/O complete notification to the user, step 510, using polling or interrupt as discussed in more detail below. This implementation prevents any external computer from ever knowing which regions of the server's memory can be directly accessed using the server RDMA NIC 55.

In alternative implementations of the read command, different RDMA protocols can be used to accomplish the same result. For example, the LWIO agent 37 can call an RDMA Read operation. The client 20 and server 49 would exchange messages as before, except that the server 49 would respond with information including the server's own DMA virtual address and the client NIC 53 would Read the information from the server's RDMA Page Pool 311 directly to its application buffers 307. The Read operation has the disadvantage of exposing the server's internal addressing, although it enables the client 20 to keep its own addressing secure. In the most secure implementation, the client 20 and server 49 could use Post Send/Post Receive commands, in which neither computer knows the other's internal addressing. The client 20 would first send a message providing information regarding the data to be transferred; the server 49 would then send a Post Send message containing the data, which would be received by the client 20. Other than the initial message sent by the client, the sequence of transmissions would look very similar to those described below with respect to FIG. 6.

Figure 6:
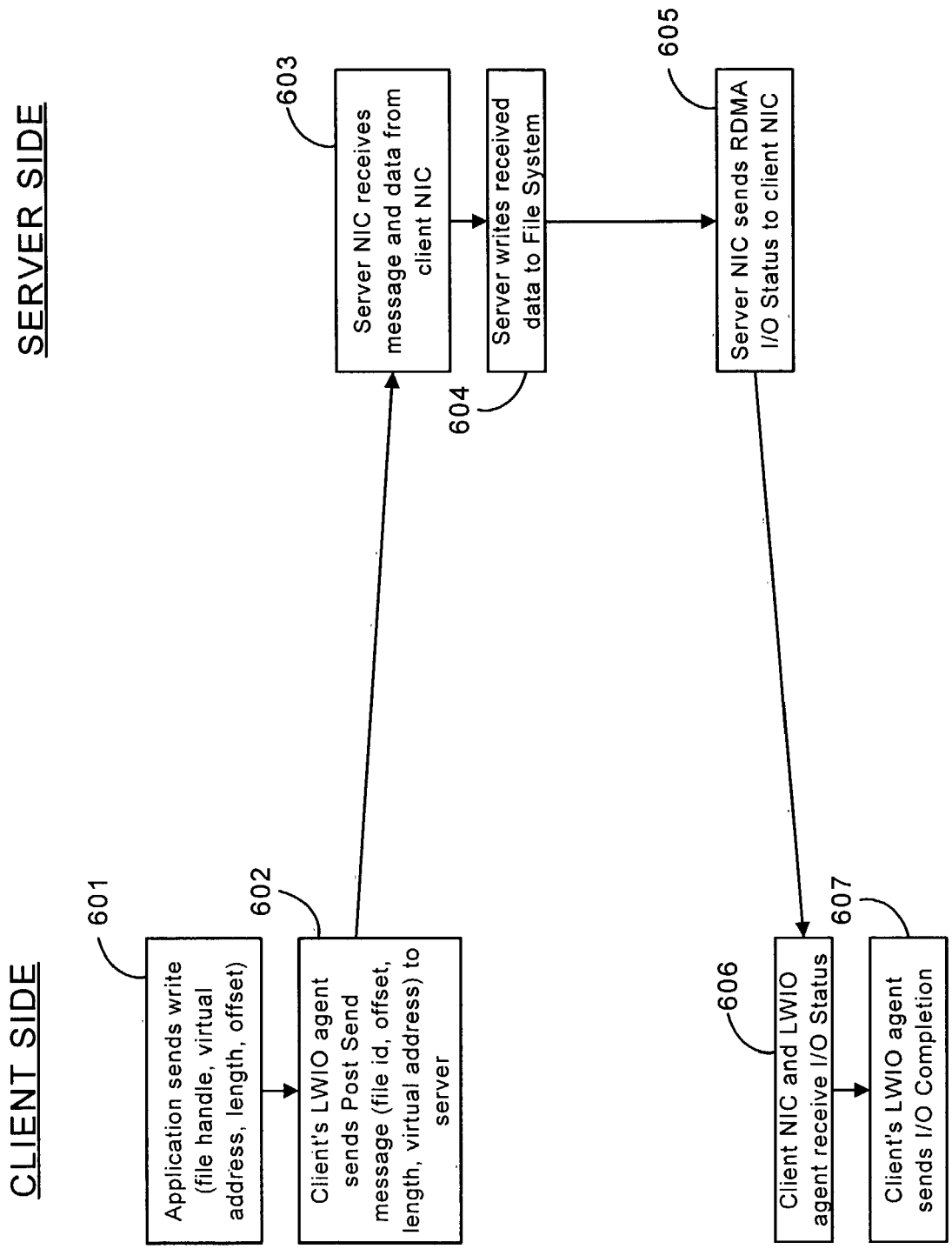
FIG. 6 is a schematic diagram illustrating the structure of an LWIO-compatible file handle within an embodiment of the invention.

When writing information to the server 49, it is often desirable to shield the server's virtual addressing information from external computers. As a result, in the embodiment shown on FIG. 6, Post Send/Post Receive semantics are used instead of the normal Write and Read RDMA operations. When using Post Send and Post Receive commands, neither client 20 nor server 49 knows the internal virtual addressing of the other machine. However, since each machine has an RDMA-compatible NIC, each NIC can still write directly to memory. As shown in FIG. 6, an application's I/O write command is intercepted by the LWIO agent 37 in step 601 and a Post Send message is sent to the server 49 signaling that the client 20 wishes to write some data, step 602. This message is received by the server 49, step 603, and the server RDMA-compatible NIC 55 saves the data being sent it by the client 20 in its own RDMA Page Pool 311. Once the data has been completely received by the server 49, the data is written by the server 49 to its disk 50 using native file system calls, step 604. The server 49 then returns an I/O status message to the client 20 indicating that the I/O has been completed successfully, step 605. The client 20 receives this response, step 606, and the client LWIO agent 37 forwards this completion notification to the user, step 607, using polling or interrupt events. This is a fairly simple system and works well when security is a significant concern. However, the RDMA Read and Write commands are faster and preferable if they can be utilized.

Figure 7:
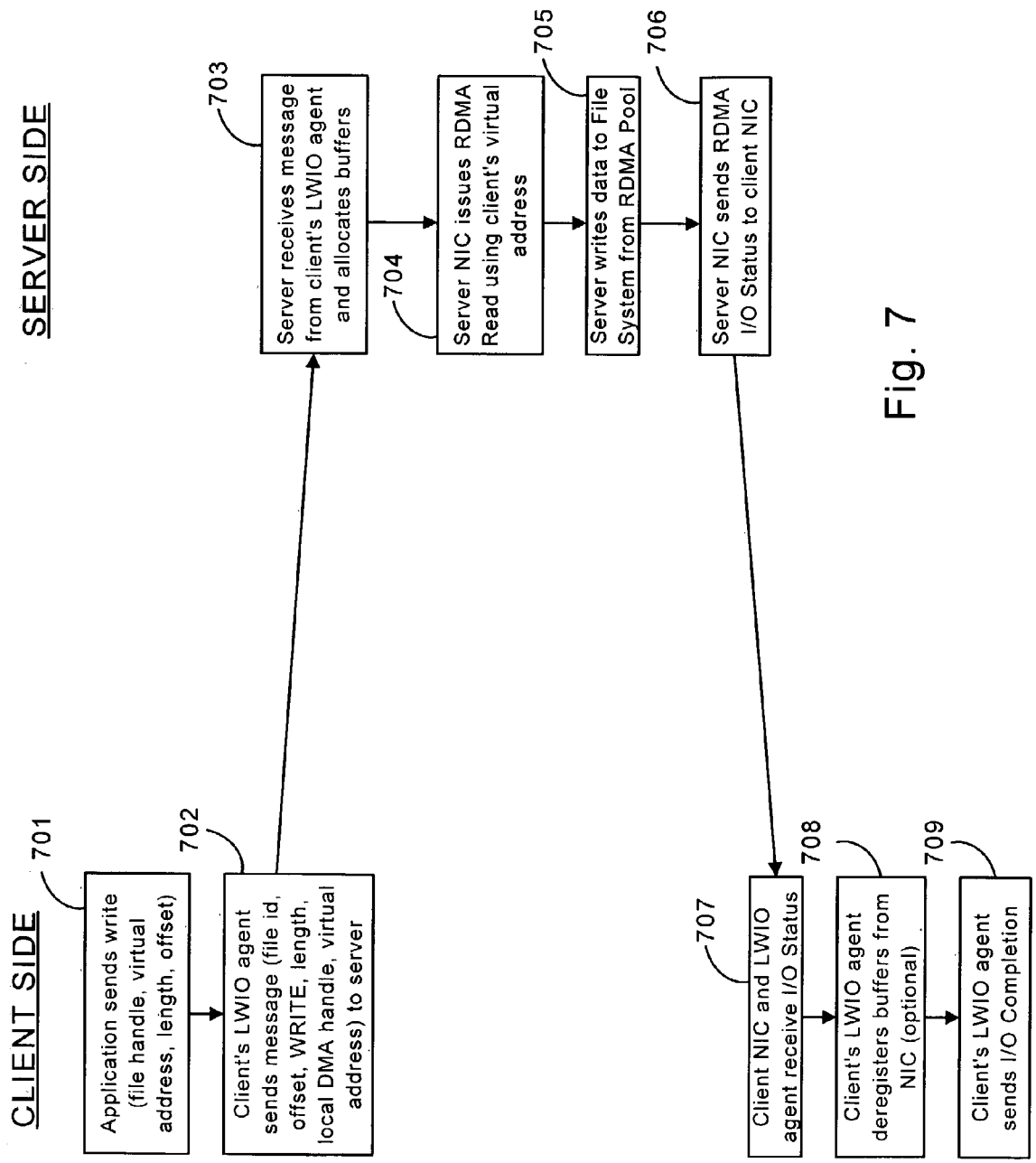
FIG. 7 is a flow diagram illustrating the exemplary execution of a read command sent by an RDMA-compatible client according to an embodiment of the invention.

In a situation in which security remains a concern and the RDMA Read protocol is available, the process shown in FIG. 7 can be implemented. Here, the LWIO agent 37, upon intercepting an application's I/O write command in step 701, sends a message to the server 49 indicating that it wishes to write some data to a particular file, step 702. This message contains similar information to that passed along with the read command as described above, including the client's DMA handle and virtual address. After receiving the message and allocating buffers to save the transferred data, step 703, the server RDMA NIC 55 issues a RDMA Read command, step 704. This Read command specifies the client's virtual address at which the data sits in the application buffers 307, and the data is copied directly to the RDMA Page Pool 311. The client's RDMA NIC 53 is not, however, given information regarding where in the RDMA Page Pool 311 the information will be copied, and so server 49 security is retained. Once the data has been transferred to the RDMA Page Pool 311, it is then copied by the native file system to the file specified in the originally sent message residing on the disk 50, step 705. The server NIC 55 than sends an I/O completion message to the client, step 706, which message is received, step 707, and passed on to the user-level application 38 by the LWIO agent 37 using polling or interrupts as appropriate, step 709. In addition, if the buffer used to write this information was registered specifically for this transfer, it is now deregistered to prevent unauthorized access by external computers, step 708.

Figure 8:
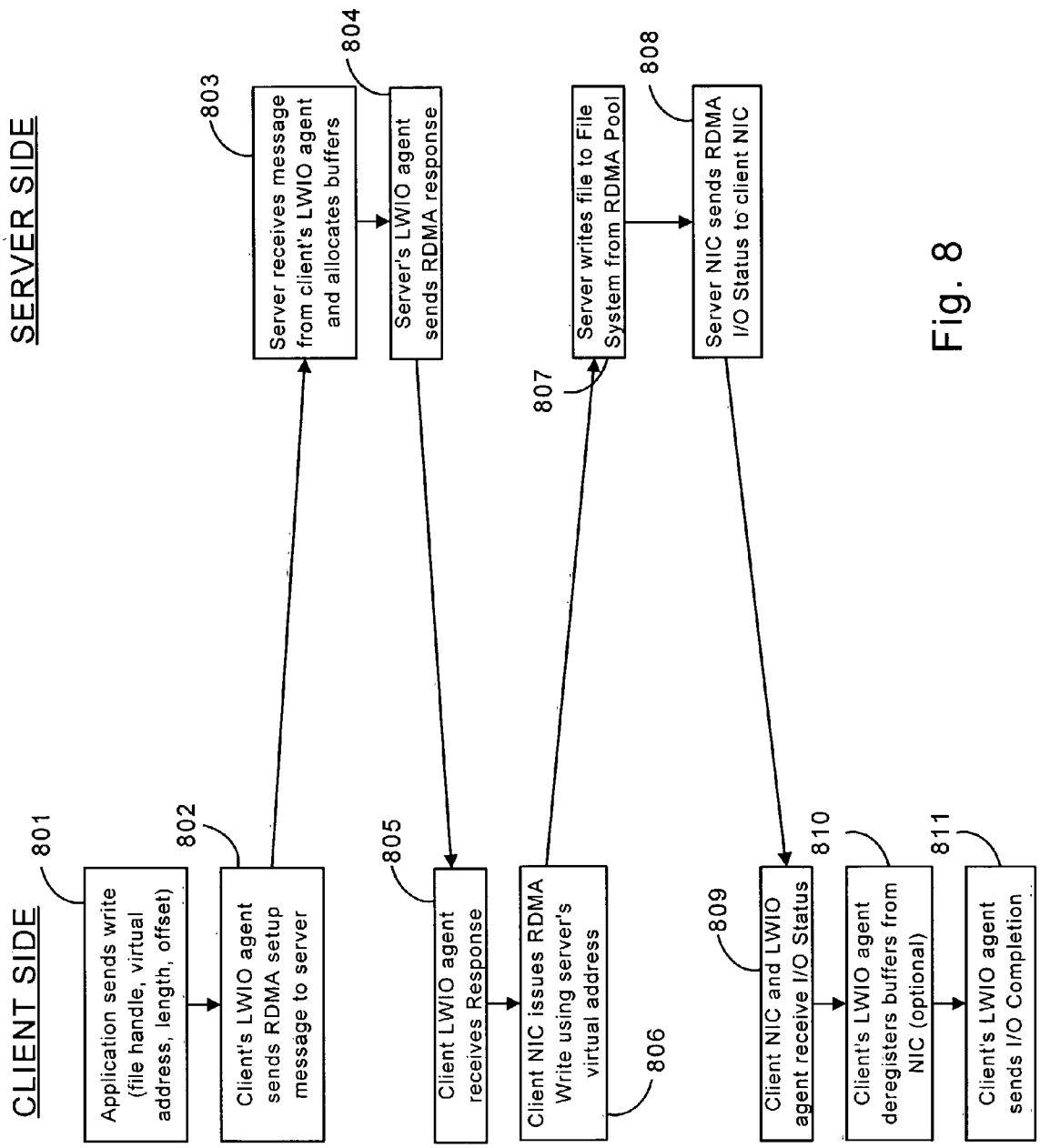
FIG. 8 is a flow diagram illustrating an exemplary execution of a write command sent by an RDMA-compatible client according to an embodiment of the invention.

Finally, if security is not an issue (e.g. if the system area network is very secure against external threats), a write command can be used as shown in FIG. 8. Upon receiving an application's I/O write command, step 801, the LWIO agent 37 sends an RDMA setup message to the server 49, step 802, informing the server 49 that it wishes to send a piece of data. This setup message contains information regarding, among other information: which file the incoming data should be written to and how much data will be transferred. Having received this information, step 803, the server 49 allocates enough memory, step 804, in the RDMA Page Pool 311 to accommodate the incoming data, and sends a response back to the client, step 805. This response includes the server's DMA virtual address to which the client 20 can write the data. The client RDMA NIC 53 then issues an RDMA Write command, step 806, transferring the data from the client's application buffers 307 directly to the server's RDMA Page Pool 311. Once the data has been transferred, it is written to the disk 50 at an appropriate location using native file system calls, step 807, and the server NIC 55 returns an I/O completion message, step 808.

The message is passed on by the LWIO agent 37 to the user-level application 38 using polling or interrupts as preferred, step 811. In addition, if the buffer used to write this information was registered specifically for this transfer, it is now deregistered to prevent improper access by external computers, step 810.

While the above described examples involve certain methods of translating I/O commands into RDMA commands, it will be appreciated by those of skill in the art that especially as alternative RDMA commands are more widely used, the LWIO agent 37 may also use other commands to accomplish the same data transfer results.

As part of the LWIO agent's 37 communication functionality, it should also have the ability to accommodate failure in an RDMA communications link. Since LWIO has access to both legacy and RDMA network protocols, which use is transparent to the requesting client application, the LWIO agent 37 can coordinate with the server LWIO agent 308 to switch between protocols. Thus, for example, if a single RDMA-compatible NIC 53 fails on a client 20 with multiple NICs, the LWIO agent 37 can orchestrate the transfer of network communications from the RDMA-compatible NIC 53 to another NIC (RDMA-compatible or not) on the client. Similarly, during a situation in which the RDMA capabilities of a server suddenly fail, the client LWIO agent 37 and server LWIO agent 308 can begin using legacy protocols for the transfer instead. In any such RDMA failure, it is equally important that the LWIO agent 37 de-allocate those resources associated with the failed RDMA transfer to prevent security holes and unused resources from remaining registered with a RDMA NIC.

Figure 9:
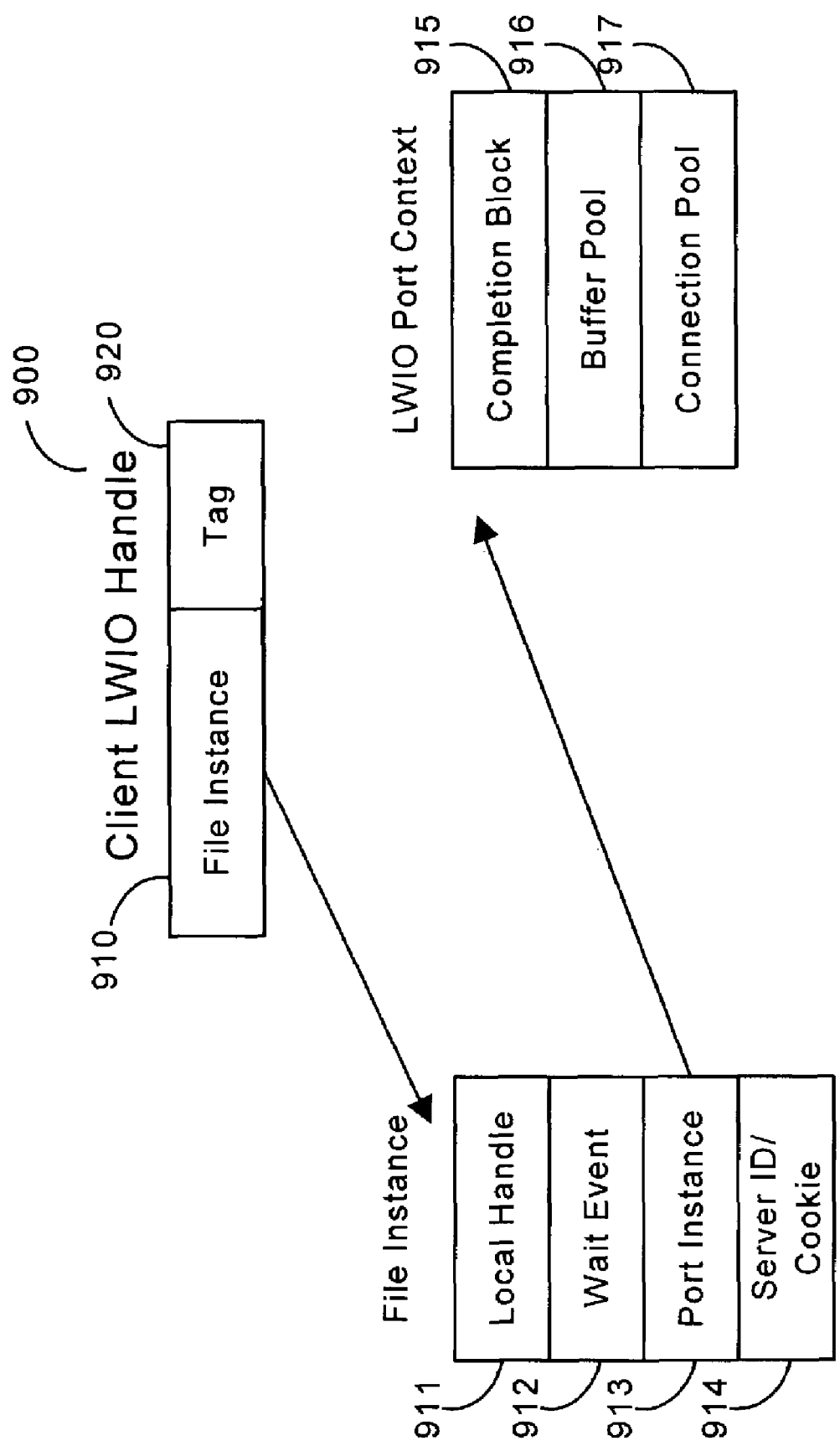
FIG. 9 is a flow diagram illustrating another exemplary execution of a write command sent by an RDMA-compatible client according to an embodiment of the invention.

With many file handles being managed by one LWIO agent, a means of efficiently organizing, controlling and coordinating them is also desired. To meet this need, a LWIO port is disclosed, with which multiple file handles can be associated. The principal purpose for which this LWIO port is instantiated is to group file handles according to their affinities, or their shared characteristics. As is shown in FIG. 9, the client LWIO handle 900 is associated with a port instance 913, that can be used to both register file handle events 915 or to perform actions on multiple file handles with a single abstraction 916. So, for example, if a number of file handles referencing files stored on a single server are associated with a single port, that port can be used to de-reference or shift the reference of all the file handles at once if the server goes off-line. Thus, the type of failure handling implemented by LWIO (transitioning between RDMA and legacy protocols depending on RDMA or legacy availability; shifting hardware dependencies depending on availability) is facilitated by this construct.

The port 913 can also be used to load-balance, across servers or across NICs. By grouping information on file handles according to used physical resources 917, a port can provide this information to the LWIO agent 37 or interested application 36 when the agent or program is deciding which physical resources 917 to associate with a particular file handle 900. In one embodiment, an LWIO agent 37 will associate a file handle with the least "crowded" physical resource based on the information provided by the LWIO port 913.

Beyond the advantages of associating file handles according to shared characteristics, the port 913 also provides a means of allocating and pre-registering a portion of memory buffer 916 which can then be provided to a number of different file handles for RDMA operations. When a port 913 is created, a portion of the memory buffer 916 is associated with that port 913, and that memory 916 is registered with the NIC 53 with which the port is associated. When a new file handle 900 is associated with that port 913, the file handle inherits the ability to use that pre-registered memory rather than registering memory at run-time when it is needed. As different file handles become associated with the port and cease their associations with the port, this pool of memory buffers 916 remains constant, unless explicit instructions are given to the port to change its registered memory. This algorithm represents a substantial system resources savings, by preventing individual file instances 910 from registering memory for themselves.

Another advantage provided by the port 913 is the ability to easily signal completion using a completion block 915. Once a read or write I/O operation has been called using a file handle, the application calling the operation should be informed when the operation has been completed. Traditionally, once an I/O operation has been completed, the device or software process completing the I/O will send an interrupt. In one embodiment, this interrupt is translated into an event, which can be detected by the application originally calling the operation. While this method has the advantage of only stopping CPU operations briefly once an I/O operation has completed, large numbers of I/O operations can quickly drain system resources.

The port construct enables a different strategy for signaling I/O completion: polling. Once a particular file handle 900 has been associated with a port 913, it also has access to a completion block 915. When an T/O operation has completed, the LWIO agent 37 can post this information in the completion block 915 of the port instance 913. To further minimize the use of system resources, the LWIO agent 37 can even utilize the application's own processing threads to perform this completion notification. However, even though the completion block 915 has been modified to indicate a completed I/O operation, the application 36 has not been notified of the completion until it "polls" or checks the status on the completion block 915. This polling, however, obviates a CPU interrupt, since the application 36 can perform this I/O status check using its own resources previously allocated from the CPU. In this way, I/O completion can be signaled without using excessive system resources. Polling, too, has its shortcomings, however; for example, if a particular I/O operation will take a long time to complete, or if the application no longer has allocated CPU resources for continuing to poll the port completion block 915, polling becomes less attractive.

Since both polling and interrupts are appropriate for different environments, the port 913 preferably enables an application 36 or the LWIO agent 37 to switch between these two methods of signaling I/O completion. In one embodiment, the port 913 can be set to poll as a default operational choice, but set to interrupt for the next I/O completion received when desirable. Upon receiving the event and sending an interrupt, the port 913 automatically begins polling again. In alternative embodiments, the port 913 can be set to poll at all times, or interrupt at all times depending on the particular advantages of each implementation.

Although file access via legacy protocols and via LWIO protocols have been discussed separately above, note that coherency across protocols is preferably supported. For example, a first application should preferably be able to access a file via the LWIO protocols without causing inconsistency in a second application's access to the same file via legacy protocols, although the file handles may differ. Thus, in a specific example, if application A and application B both access a particular file, and application A saves an update to the file via LWIO, a subsequent legacy protocol refresh read of the file by application B should reflect the update. Furthermore, the type of transfer mechanism used may be transparent to the relevant application, as discussed above.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for implementing remote direct memory access protocols in a system area network comprising a first computer and a second computer, the method comprising:
   creating a file handle located on the first computer that points to a file on the second computer, wherein the file handle is associated with a port on the first computer;
   dynamically determining, using the file handle, if the first computer and the second computer can exchange data stored in the file via the remote direct memory access protocols;
   if the first computer and the second computer can exchange the data via the remote direct memory access protocols:
      registering a memory buffer on the first computer for temporarily storing the data, intercepting the data, and exchanging the data by enabling direct access to the memory buffer via the remote direct memory access protocols; and
      receiving a completion notification by the first computer, wherein the completion notification is received by a method selected from the group consisting of interrupting and polling; and
   if the first computer and the second computer cannot exchange the data via the remote direct memory access protocols, exchanging the data via legacy protocols.

2. The method of claim 1, wherein the step of exchanging the data via the remote direct memory access protocols is initiated by an application on the first computer using a same command used to initiate the step of exchanging the data via the legacy protocols.

3. The method of claim 2, wherein the choice of exchanging the data via the remote direct memory access protocols or via the legacy protocols is transparent to the application.

4. The method of claim 1, wherein the port facilitates the receipt of the completion notification.

5. The method of claim 1, wherein the association between the file handle and the port is made based on a characteristic of the file handle.

6. The method of claim 1, wherein the step of registering the memory buffer further comprises pre-registering a port-associated memory buffer on the first computer associated with the port.

7. The method of claim 6, wherein the step of registering the memory buffer on the first computer for temporarily storing the data further comprises copying the data to the port-associated memory buffer.

8. The method of claim 1, wherein the step of exchanging the data via the remote direct memory access protocols further comprises using a technique selected from the group consisting of remote direct memory access Read commands, Write commands and Post Send/Post Receive commands.

9. The method of claim 1, wherein the step of exchanging the data via the remote direct memory access protocols further comprises:
   detecting a remote direct memory access protocol failure between the first computer and the second computer; and
   exchanging the data via the legacy protocols.

10. A method for implementing remote direct memory access protocols in a system area network comprising a first computer and a second computer, the method comprising:
   creating a file located on the second computer that is referenced by a file handle on the first computer, wherein the file handle is associated with a port on the first computer;
   dynamically determining, using the file handle, if the first computer and the second computer can exchange data stored in the file via the remote direct memory access protocols;
   sending the result of the determination from the second computer to the first computer;
   if the first computer and the second computer can exchange the data via the remote direct memory access protocols:
      registering a memory buffer on the second computer for temporarily storing the data, intercepting the data, and exchanging the data by enabling direct access to the memory buffer via the remote direct memory access protocols; and
      receiving a completion notification by the second computer, wherein the completion notification is received by a method selected from the group consisting of interrupting and polling; and
   if the first computer and the second computer cannot exchange the data via the remote direct memory access protocols, exchanging the data via legacy protocols.

11. The method of claim 10, wherein the direct access to the memory buffer is enabled only for the second computer.

12. The method of claim 10, wherein the step of exchanging the data via the remote direct memory access protocols further comprises using at least one technique selected from the group consisting of remote direct memory access Read commands, Write commands and Post Send/Post Receive commands.

13. The method of claim 10, wherein the step of exchanging the data via the remote direct memory access protocols further comprises:
   detecting a remote direct memory access protocol failure between the first computer and the second computer; and
   exchanging the data via the legacy protocols.

14. The method of claim 10, wherein the port facilitates the receipt of the completion notification.

15. A computer system in a system area network within which remote direct memory access protocols can be implemented, the computer system comprising:
   a file handle for identifying and accessing a file stored remotely, wherein the file handle is associated with a port on the computer;
   an application for issuing commands to initiate a data exchange with respect to the file handle;
   an interface agent for intercepting the commands, dynamically determining if the computer system can communicate through one of a remote direct memory access protocol and a legacy network protocol using the file handle, routing the commands to a layer selected from the group consisting of a legacy networking layer and a remote direct memory access layer based on the determination, intercepting a completion notification sent by the remote direct memory access layer if the remote access layer is used, and forwarding the completion notification to the application by a method selected from the group consisting of interrupting and polling;
a registered memory buffer for temporarily storing the data;
a legacy networking layer for exchanging the data using legacy protocols; and
a remote direct memory access layer for exchanging the data by enabling direct access to the registered memory buffer using remote direct memory access protocols.

16. The computer system of claim 15, wherein the choice made by the interface agent in routing the commands is transparent to the application issuing the commands.

17. The computer system of claim 15, further comprising: the port associated with the file handle for facilitating the interface agent's forwarding of the completion notification, wherein the port is also associated with at least one other file handle having at least one shared characteristic.

18. The computer system of claim 15, further comprising: a port associated with the file handle for facilitating exchanging the data using the remote direct memory access protocols, wherein the port is also associated with at least one other file handle having at least one shared characteristic.

19. The computer system of claim 18, wherein the association between the file handle and the port is made based on the at least one shared characteristic.

20. The computer system of claim 18, wherein the registered memory buffer further comprises a pre-registered memory buffer associated with the port.

21. The computer system of claim 15, wherein the remote direct memory access layer further provides access to a plurality of techniques selected from the group consisting of remote direct memory access Read commands, Write commands and Post Send/Post Receive commands.

22. The computer system of claim 15, wherein the interface agent, upon detecting a remote direct memory access protocol failure, routes the commands to the legacy networking layer.

23. A computer system in a system area network within which remote direct memory access protocols can be implemented, the computer system comprising:
a file for storing long-term information, which can be accessed using a file handle stored remotely, wherein the file handle is associated with a port on a computer storing the file handle;
an interface agent for intercepting commands for remotely exchanging data with respect to the file, dynamically determining if the computer system can communicate through one of a remote direct memory access protocol and a legacy network protocol using the file handle, routing the commands to a layer selected from the group of layers consisting of a legacy networking layer and a remote direct memory access layer based on the determination, intercepting a completion notification sent by the remote direct memory access layer if the remote access layer is used, and forwarding the completion notification to the application by a method selected from the group consisting of interrupting and polling;
a registered memory buffer for temporarily storing the data;
a legacy networking layer for exchanging the data using legacy protocols; and
a remote direct memory access layer for exchanging the data by enabling direct access to the registered memory buffer using remote direct memory access protocols.

24. The computer system of claim 23, wherein the remote direct memory access layer further provides access to a plurality of techniques selected from the group consisting of remote direct memory access Read commands, Write commands and Post Send/Post Receive commands.

25. The computer system of claim 23, wherein the interface agent, upon detecting a remote direct memory access protocol failure, routes the commands to the legacy networking layer.

26. A computer system in a system area network within which remote direct memory access protocols can be implemented, the computer system comprising:
first and second file handles for identifying and accessing a file stored remotely, wherein the first and second file handles are associated with ports on a computer storing the first and second file handles;
first and second applications for issuing commands to initiate a data exchange with respect to the file via the first and second file handles respectively;
an interface agent for intercepting the commands, dynamically determining if the first and second applications can communicate through one of a remote direct memory access protocol and a legacy network protocol using the first and second file handles, routing the commands to a layer selected from the group consisting of a legacy networking layer and a remote direct memory access layer, wherein commands related to the first file handle are routed via the legacy networking layer transparently to the first application and commands related to the second file handle are routed via the remote direct memory access layer transparently to the second application, wherein access to the file by the first application using the first handle is compatible with access to the file by the second application using the second handle, and wherein the intercept agent is further configured for intercepting a completion notification sent by the remote direct memory access layer if the remote access layer is used, and forwarding the completion notification to the application by a method selected from the group consisting of interrupting and polling.

* * * * *